Figure 1:
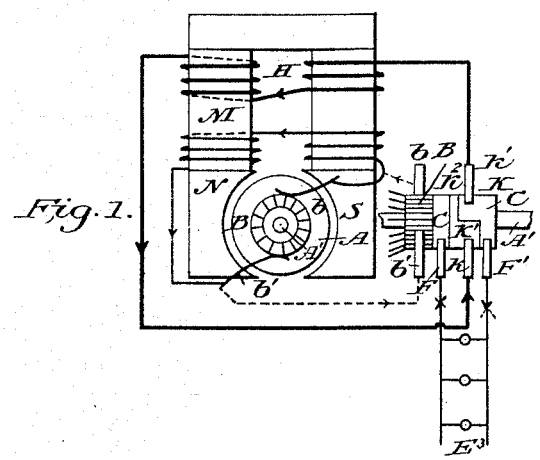

(No Model.)

T. H. HICKS.
BIPOLAR ELECTRICAL MACHINE.

No. 491,106.  Patented Feb. 7, 1893.

Witnesses.  
W. Bennett  
Nelson K. Riddle

Inventor.  
Thomas H. Hicks  
By Newell S. Wright,  
His Attorney.

UNITED STATES PATENT OFFICE.

THOMAS HAMMILL HICKS, OF DETROIT, MICHIGAN, ASSIGNOR OF ONE-HALF TO GEORGE F. CASE, OF SAME PLACE.

BIPOLAR ELECTRICAL MACHINE.

SPECIFICATION forming part of Letters Patent No. 491,106, dated February 7, 1893.

Application filed February 8, 1892. Serial No. 420,672. (No model.)

*To all whom it may concern:*

Be it known that I, THOMAS HAMMILL HICKS, a subject of the Queen of Great Britain, residing at Detroit, county of Wayne, State of Michigan, have invented a certain new and useful Improvement in a Bipolar Electrical Machine; and I declare the following to be a full, clear, and exact description of the invention, such as will enable others skilled in the art to which it appertains to make and use the same, reference being had to the accompanying drawings, which form a part of this specification.

My invention relates to certain new and useful improvements in electrical dynamos, and has for its specific object the construction of a bi-polar compound self-exciting alternating machine.

To this end my invention consists of the devices and appliances, their construction, combination and arrangement as hereinafter described and claimed and illustrated in the drawings submitted herewith, in which—

Figure 2:
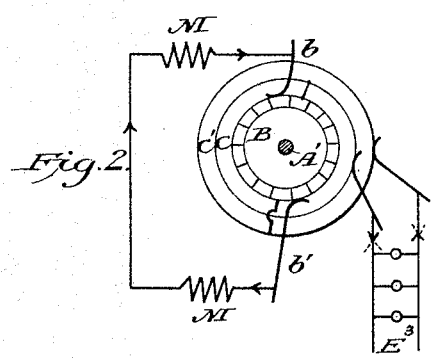
Figure 3:
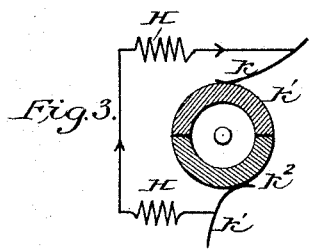

Figure 1 is a view in end elevation and diagram, showing two commutators in plan, for greater clearness of illustration, also the compound winding of the field magnets. Fig. 2 is a diagram view showing the commutator B and its connected field coils, and two rings "C" "C'" with their respective connections to the commutator bars, and the external working circuit. Fig. 3 is a sectional view through the bars $K'$ $K^2$ of the commutator K showing the compound coils of the field magnets and their connection with the brushes upon said bars.

I carry out my invention as follows:

N and S denote the field magnets, and M one set of field magnet coils.

A denotes the armature.

$A'$ is the armature shaft.

In constructing a dynamo in accordance with my invention I use either an ordinary drum armature, or the well known Gramme ring, together with the usual commutator or collector B and also the arrangement of field poles used in such types of electrical machines. I use two rings C C' and an extra two part commutator and its brushes "$k$" "$k'''$" through which brushes "$k$" $k'$ all the current of the external circuit flows.

K is the extra commutator.

H is a compound winding on the field magnets, said winding being in series with the external working circuit $E^3$.

The commutator K is designed for locally straightening that portion of the current in the external working circuit included in the compound coils H on the field magnets.

In the device illustrated in Figs. 1 and 2, the armature produces two current reversals to each revolution, therefore the commutator K only needs to be constructed of two parts $K'$ $K^2$. In this way constant potential will be maintained in the working circuits from the fact that all of the current used in the working circuits passes through the compound windings on the field magnets in one direction in a similar manner to that set forth in a prior application filed by me February 4, 1892, Serial No. 420,297.

The single arrow heads indicate circuits in which currents of a single direction are flowing, and the full and dotted arrow heads forming as it were double arrow heads indicate circuits supplied with alternating currents. It will be readily seen in Fig. 1 that the alternating current is locally straightened in the compound coils only such coils forming a portion of the external working circuit.

What I claim as my invention is:

1. In a bi-polar electrical machine the combination of an armature symmetrically wound, its conductor B and its brushes, field magnet coils M supplied with continuous currents from said armature, an external working circuit supplied with alternating currents from said armature, the field magnets provided with supplemental windings H in series with the external working circuit, and a second commutator K provided with rings C C' supplying the external working circuit with alternating currents, the bars of said commutator K locally straightening the current through the supplemental windings H of the field magnets, substantially as described.

2. In a bi-polar electrical machine, field magnets wound with two sets of coils, an armature, and an external working circuit, one set of said coils on the field magnets being in series with the external working circuit, said external working circuit supplied with alternating currents and the other set of said coils on the field magnets supplied with currents direct from the armature, both sets of said coils acting mutually to maintain the field of force, substantially as described.

In testimony whereof I sign this specification in the presence of two witnesses.

THOMAS HAMMILL HICKS.

Witnesses:
N. S. WRIGHT,
JOHN F. MILLER.